(12) United States Patent
Ooshima et al.

(10) Patent No.: US 12,229,271 B2
(45) Date of Patent: Feb. 18, 2025

(54) CONTROL APPARATUS FOR VEHICLE

(71) Applicant: SUBARU CORPORATION, Tokyo (JP)

(72) Inventors: Hironori Ooshima, Tokyo (JP); Hisataro Iinami, Tokyo (JP); Kouichi Seki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 267 days.

(21) Appl. No.: 17/578,959

(22) Filed: Jan. 19, 2022

(65) Prior Publication Data

US 2022/0245254 A1 Aug. 4, 2022

(30) Foreign Application Priority Data

Feb. 2, 2021 (JP) ................................. 2021-015054

(51) Int. Cl.
*G06F 21/57* (2013.01)
*G06F 9/4401* (2018.01)

(52) U.S. Cl.
CPC .......... *G06F 21/575* (2013.01); *G06F 9/4401* (2013.01); *G06F 2221/034* (2013.01)

(58) Field of Classification Search
None
See application file for complete search history.

(56) References Cited

U.S. PATENT DOCUMENTS

| 2010/0191949 | A1 | 7/2010 | Shishido et al. | |
|---|---|---|---|---|
| 2013/0212659 | A1* | 8/2013 | Maher | G05D 1/0022 726/6 |
| 2015/0163306 | A1* | 6/2015 | Nakagawa | B60R 25/24 709/225 |
| 2018/0191738 | A1* | 7/2018 | David | H04L 63/105 |
| 2020/0034531 | A1* | 1/2020 | Seki | B60R 25/241 |
| 2022/0171855 | A1* | 6/2022 | Yamazaki | G06F 9/4401 |

FOREIGN PATENT DOCUMENTS

| JP | 2004-276782 A | 10/2004 |
|---|---|---|
| JP | 2010-208353 A | 9/2010 |
| JP | 2018-195329 A | 12/2018 |
| JP | 2019-066984 A | 4/2019 |
| JP | 6639615 B1 | 2/2020 |
| WO | 2009/013831 A1 | 1/2009 |
| WO | 2015-174526 A1 | 11/2015 |

OTHER PUBLICATIONS

Notice of Reasons for Refusal received in corresponding Japanese Patent Application No. 2021-015054 on Apr. 16, 2024.
Office Action issued Jul. 23, 2024, from corresponding Japan Application No. 2021-015054, 6 pages.

* cited by examiner

*Primary Examiner* — Thu V Nguyen
*Assistant Examiner* — Emad Siddiqi
(74) *Attorney, Agent, or Firm* — Rimon P.C.

(57) ABSTRACT

A control apparatus for a vehicle includes a processor, a storage, and a first determining unit. The processor is configured to control a control target mounted in the vehicle. The storage is configured to contain unauthorized entry data. The unauthorized entry data indicates a presence of an unauthorized entry into the vehicle. The first determining unit is configured to make a determination on a necessity of a secure boot process upon activation of the processor, on the basis of the unauthorized entry data.

12 Claims, 4 Drawing Sheets

CONTROL APPARATUS FOR VEHICLE

CROSS-REFERENCE TO RELATED APPLICATIONS

The present application claims priority from Japanese Patent Application No. 2021-015054 filed on Feb. 2, 2021, the entire contents of which are hereby incorporated by reference.

BACKGROUND

The technology relates to a control apparatus for a vehicle.

A vehicle is mounted with a control apparatus for the vehicle. The control apparatus includes a plurality of electronic control units (ECUs). The vehicle is controlled by an operation of each ECU which is based on a predetermined program. Various operations of an automatic driving technique of recent years are also controlled by the ECUs, including, for example, a confirmation of a situation around the vehicle and an automatic traveling such as traveling, turning, or stopping. Accordingly, a stable traveling of the vehicle can be impaired if, for example, a program of any ECU is tampered improperly.

The vehicle is adapted to communicate with a network in recent years, making gradually apparent a concern such as a program tampering of any ECU by a malicious attack from the outside. Some ECUs perform a control on the basis of a program stored in a detachable non-volatile memory, in which case, for example, the non-volatile memory of any ECU in a sleep state during parking of the vehicle can be exchanged improperly to tamper the program of the ECU.

To address such tampering, the ECU executes a secure boot process. The secure boot process prevents an improperly-tampered program from being executed by verifying a safety of programs upon activation or booting. The secure boot process utilizes a cryptographic technique to verify the safety of the programs. The secure boot process permits the activation of the ECU in a case where the programs are not tampered, and makes it possible to prevent the ECU from being activated upon a detection of the tampering of any program in a case where the tampering of the program is detected.

The ECU is strictly limited in an activation time from the start of the activation to the completion of the activation. For example, the activation time may be within a range from tens of milliseconds to hundreds of milliseconds. This means that it is necessary to complete the verification performed by the secure boot process within the activation time after which the ECU starts any control. Accordingly, a technique has been proposed that shortens a process time of the secure boot process, as disclosed in Japanese Patent (JP-B) No. 6639615, for example.

JP-B No. 6639615 discloses that a verification of pieces of data is performed between data acquired from another ECU upon a stop of a relevant ECU and data acquired from the other ECU upon activation of the relevant ECU. Regions to be verified by the secure boot are partially skipped in a case where a possibility of tampering is determined as being low to shorten a time required for the secure boot process.

SUMMARY

An aspect of the technology provides a control apparatus for a vehicle. The control apparatus includes a processor, a storage, and a first determining unit. The processor is configured to control a control target mounted in the vehicle. The storage is configured to contain unauthorized entry data. The unauthorized entry data indicates a presence of an unauthorized entry into the vehicle. The first determining unit is configured to make a determination on a necessity of a secure boot process upon activation of the processor, on the basis of the unauthorized entry data.

An aspect of the technology provides a control apparatus for a vehicle. The control apparatus includes a storage and circuitry. The storage is configured to contain unauthorized entry data. The unauthorized entry data indicates a presence of an unauthorized entry into the vehicle. The circuitry is configured to control a control target mounted in the vehicle, and make a determination on a necessity of a secure boot process upon activation of the control apparatus, on the basis of the unauthorized entry data.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
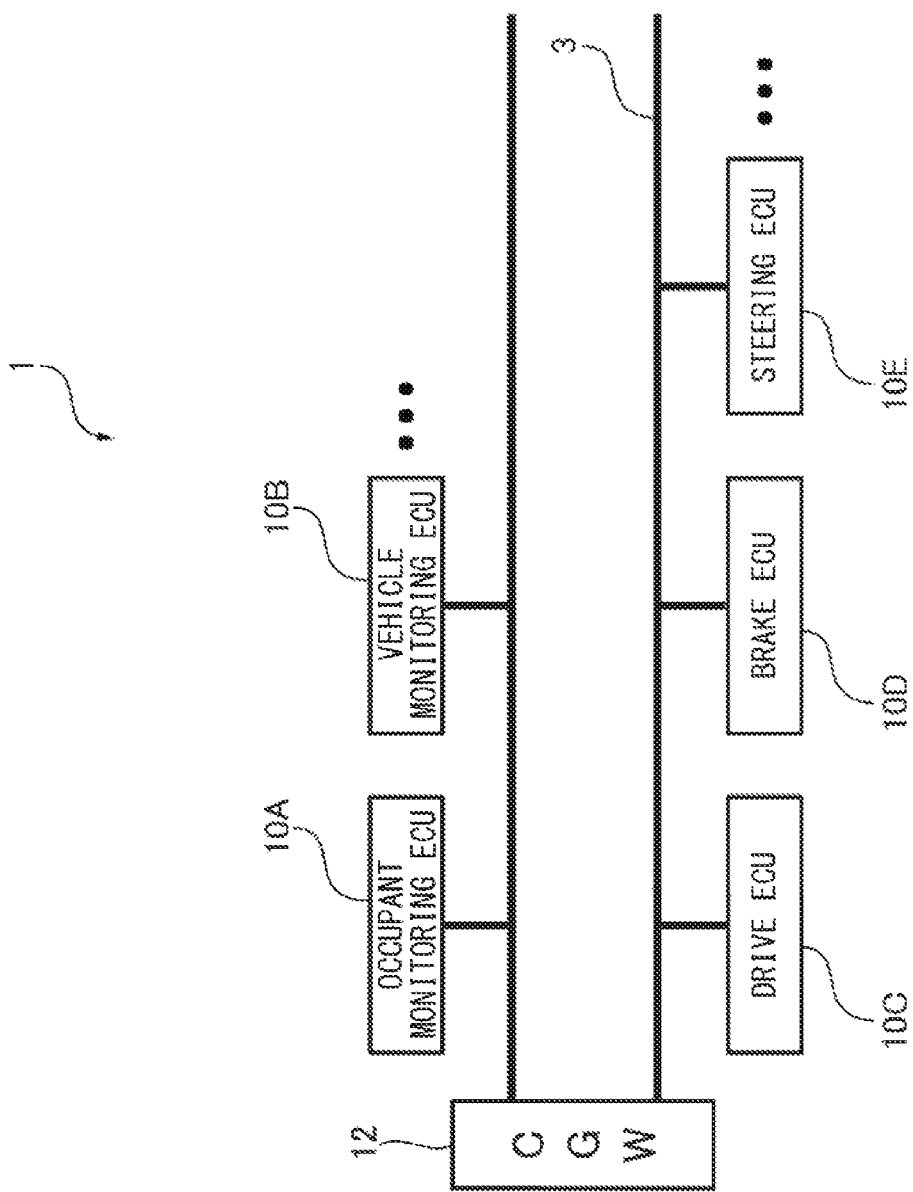
FIG. 1 is a diagram schematically illustrating a configuration of a vehicle control system that includes a control apparatus for a vehicle according to one example embodiment of the technology.

A secure boot process disclosed in JP-B No. 6639615 performs a communication with another ECU and uses status data acquired from the other ECU for a verification upon activation of a relevant ECU. Accordingly, a time required for the secure boot process is not shortened enough, in that it is necessary to perform a standby for the activation of the other ECU and the start of the communication.

It is desirable to provide a control apparatus for a vehicle which makes it possible to shorten a process time of a secure boot process while securing a safety upon activation of any ECU.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Referring to FIG. 1, an electronic control unit (ECU) 10 may be coupled to various electronic devices necessary for a traveling of a vehicle, and may control those electronic devices. In one embodiment, the ECU 10 may serve as a "control apparatus for a vehicle". In one embodiment, the electronic device may serve as a "control target". For example, the ECU 10 may include an occupant monitoring ECU 10A, a vehicle monitoring ECU 10B, a drive ECU 10C, a brake ECU 10D, and a steering ECU 10E, which are simply referred to as the ECU 10 when referring to all of the ECUs.

The electronic devices, the ECU 10 that controls those electronic devices, etc., may be so coupled to each other as to allow for a mutual communication via an in-vehicle network 3 such as controller area network (CAN) or a local interconnect network (LIN). Further, electronic devices, the ECU 10, etc., may be coupled to a central gateway (CGW) 4 serving as a relay device to configure a vehicle control system 1. In the following description, the electronic devices, etc., that are unrelated directly to the ECU 10, or the control apparatus for the vehicle according to one embodiment, will not be described in detail and are unillustrated.

As illustrated in FIG. 1, the ECU 10 included in the vehicle control system 1 may be coupled to the electronic devices (the control targets) that are mounted in the vehicle, and may control an operation of the relevant electronic device coupled thereto on the basis of data acquired from the in-vehicle network 3. The ECU 10 may output status data to the in-vehicle network 3. The status data may indicate, for example, an operation state of the relevant electronic device coupled to the ECU 10.

For example, the occupant monitoring ECU 10A may configure a part of a driver monitoring system (DMS) that monitors an occupant riding the vehicle, and may control the electronic devices included in the driver monitoring system to monitor the occupant. Non-limiting examples of the electronic devices included in the driver monitoring system may include: a camera; a microphone; a seat sensor provided in a seat; and an open/close detection sensor of a door, which are unillustrated. The occupant monitoring ECU 10A may determine whether the occupant of the vehicle is a proper user, on the basis of an image of the occupant captured by the camera, for example. A user authentication result as a result of the determination made by the occupant monitoring ECU 10A may be outputted to the in-vehicle network 3 as the status data.

The vehicle monitoring ECU 10B may be coupled to the open/close detection sensor of the door and a key sensor of the vehicle, and may monitor the vehicle by controlling factors including, for example: opening/closing of the door; locking or unlocking of the door; and matching of keys upon the opening and the closing. For example, the vehicle monitoring ECU 10B may determine whether the door of the vehicle is open or closed and whether a key used for unlocking of the door and an authentication key registered in advance on the vehicle are coincident with each other. The vehicle monitoring ECU 10B may output, to the in-vehicle network 3, a history of opening and closing of the door and an authentication key matching result as the status data.

The drive ECU 10C, the brake ECU 10D, and the steering ECU 10E each may acquire data from the in-vehicle network 3 and control traveling of the vehicle. The drive ECU 10C, the brake ECU 10D, and the steering ECU 10E each may output, to the in-vehicle network 3, the status data indicating states of the respective electronic devices coupled to the drive ECU 10C, the brake ECU 10D, and the steering ECU 10E. Non-limiting examples of such status data may include data on a speed of the vehicle, data on an amount of pressing of a foot brake, data on whether a parking brake is on or off, and data on a steering angle of a steering wheel.

The vehicle control system 1 may further include, besides the ECU 10 described above, a plurality of ECUs that controls various electronic devices necessary for the traveling of the vehicle. It should be noted that such ECUs are unillustrated in FIG. 1.

Figure 2:
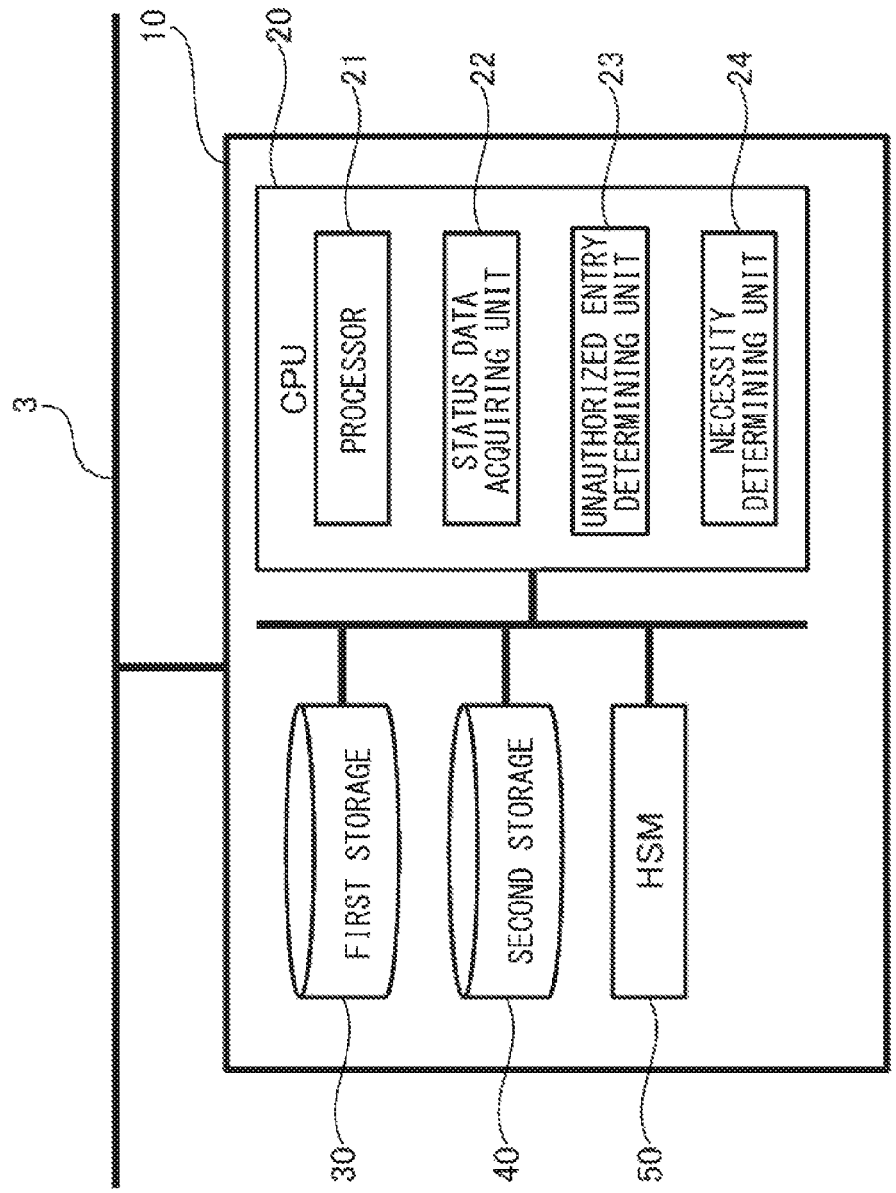
FIG. 2 is a diagram schematically illustrating a configuration of the control apparatus for the vehicle according to one example embodiment.

Referring to FIG. 2, the ECU 10 that serves as the control apparatus for the vehicle in one embodiment may be coupled to the electronic devices (the control targets), and may include a central processing unit (CPU) 20 and a second storage 40. The ECU 10 may also include a first storage 30 and a hardware security module (HSM) 50.

The CPU 20 may execute various processes on the basis of a program stored in the first storage 30. In an example embodiment, the CPU 20 may load a program stored in the first storage 30 onto a memory such as the second storage 40 and execute the program to thereby serve as a processor 21, a status data acquiring unit 22, an unauthorized entry determining unit 23, and a necessity determining unit 24 illustrated in FIG. 2. In one embodiment, the CPU 20 may serve as: a "processor"; a "status data acquiring unit" or a "data acquiring unit"; an "unauthorized entry determining unit" or a "second determining unit"; and a "necessity determining unit" or a "first determining unit".

The processor 21 controls the electronic device (the control target). In an example embodiment, the processor 21 may execute a process that activates the ECU 10 and controls the electronic device (the control target), on the basis of a control program stored in the first storage 30.

The status data acquiring unit 22 may acquire, via the in-vehicle network 3, the status data of the vehicle from other ECUs 10 coupled to the in-vehicle network 3. The status data to be acquired by the status data acquiring unit 22 may include the user authentication result obtained by the occupant monitoring ECU 10A and the authentication key matching result obtained by the vehicle monitoring ECU 10B.

The unauthorized entry determining unit 23 may determine a presence of an unauthorized entry into the vehicle, on the basis of the status data acquired by the status data acquiring unit 22. The unauthorized entry determining unit 23 may generate unauthorized entry data that is based on a result of the determination on the presence of the unauthorized entry, and store the generated unauthorized entry data in the second storage 40. The unauthorized entry determining unit 23 may store an ON flag in the second storage 40 for execution of a secure boot process, in a case where the unauthorized entry determining unit 23 has obtained, as the unauthorized entry data, a result of the determination that the unauthorized entry is present.

In a case where the unauthorized entry determining unit 23 has obtained, as the unauthorized entry data, a result of the determination that the unauthorized entry is absent, the unauthorized entry determining unit 23 may store, in the second storage 40, an OFF flag indicating that the execution of the secure boot process is unnecessary. An example of an unauthorized entry determining process to be performed by the unauthorized entry determining unit 23 will be described in greater detail.

The necessity determining unit 24 may determine a necessity of the secure boot process upon activation of the processor 21, i.e., upon the activation of the ECU 10 by the processor 21, on the basis of the unauthorized entry data stored, in the second storage 40, upon the previous activation of the ECU 10 by the processor 21. For example, the necessity determining unit 24 may determine that the secure boot process is necessary in a case where the ON flag is stored in the second storage 40, and may determine that the secure boot process is unnecessary in a case where the OFF flag is stored in the second storage 40. A result of the determination made by the necessity determining unit 24 may be notified to the HSM 50 described later.

The first storage 30 may be or may include a non-volatile memory such as a flash memory. The first storage 30 may contain the program to be executed by the CPU 20 upon the activation of the ECU 10. The first storage 30 may be a detachable storage medium such as SD card (Registered Trademark).

The second storage 40 contains the unauthorized entry data generated by the unauthorized entry determining unit 23. In some embodiments, the second storage 40 may be a random-access memory.

The HSM 50 may execute the secure boot process upon the activation of the ECU 10. The secure boot process may verify whether a program to be booted, i.e., the program to be executed by the CPU 20 is appropriate. In an example embodiment, the HSM 50 may execute the secure boot process in a case where the result of the determination made by the necessity determining unit 24 indicates that the secure boot process is necessary.

The HSM 50 may permit the processor 21 to activate the ECU 10 in a case where the program is determined as being appropriate as a result of the verification based on the secure boot process. In a case where the program is determined as being inappropriate as a result of the verification, the HSM 50 may prohibit the processor 21 from activating the ECU 10.

For example, the HSM 50 may notify the processor 21 that the activation of the ECU 10 is to be disabled in a case where the HSM 50 detects tampering of the program stored in the first storage 30. The processor 21 may boot the program only in a case where a permission for the activation of the ECU 10 is notified by the HSM 50. This configuration helps to prevent or reduce a possibility of the activation of the ECU 10 based on the improper program.

In a case where the result of the determination made by the necessity determining unit 24 indicates that the secure boot process is unnecessary, the HSM 50 may permit the activation of the ECU 10 by the processor 21 without executing all or a part of the secure boot process.

Figure 3:
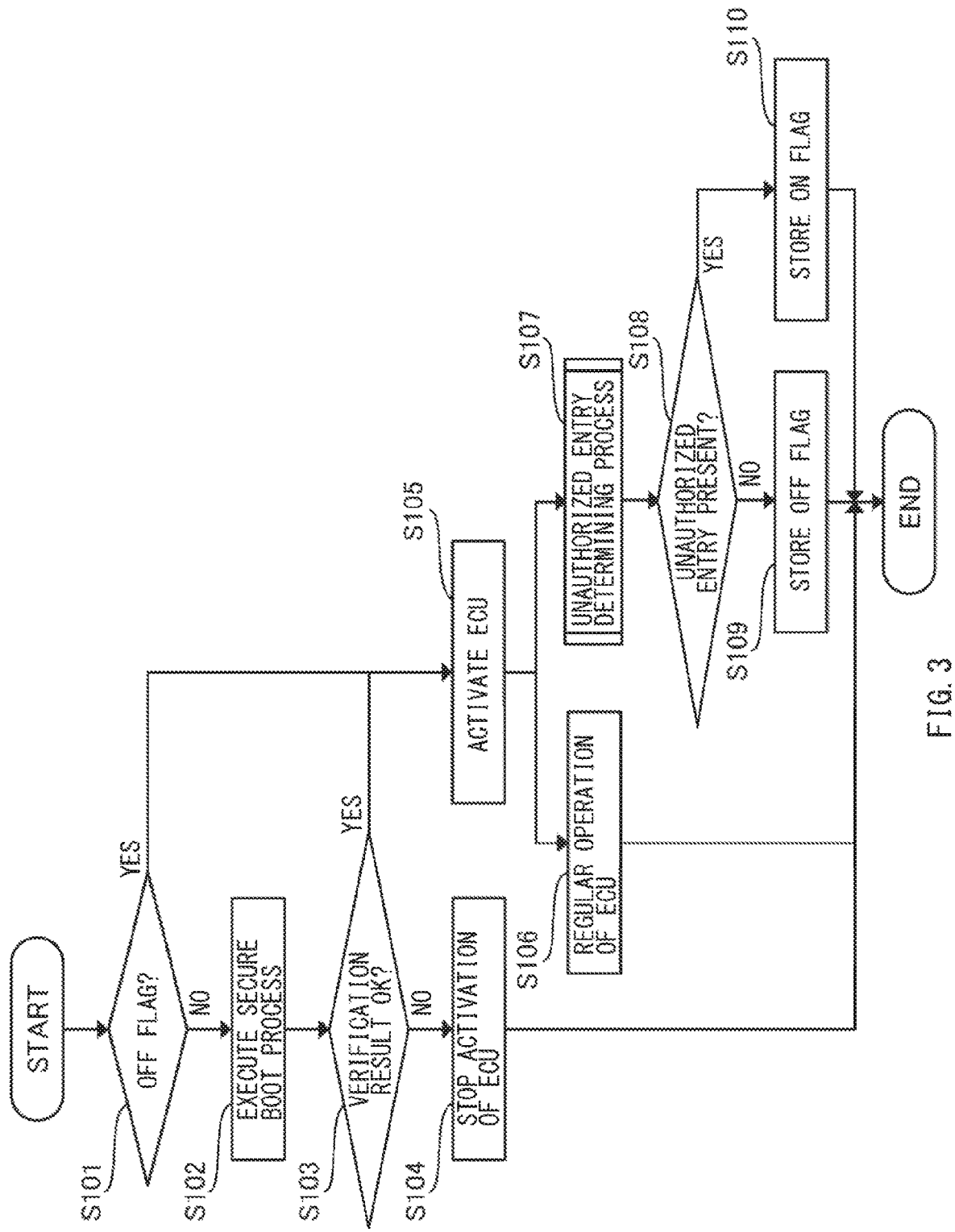
FIG. 3 is a flowchart illustrating a necessity determining process of a secure boot process and an ECU activation process performed in the control apparatus for the vehicle according to one example embodiment.
Figure 4:
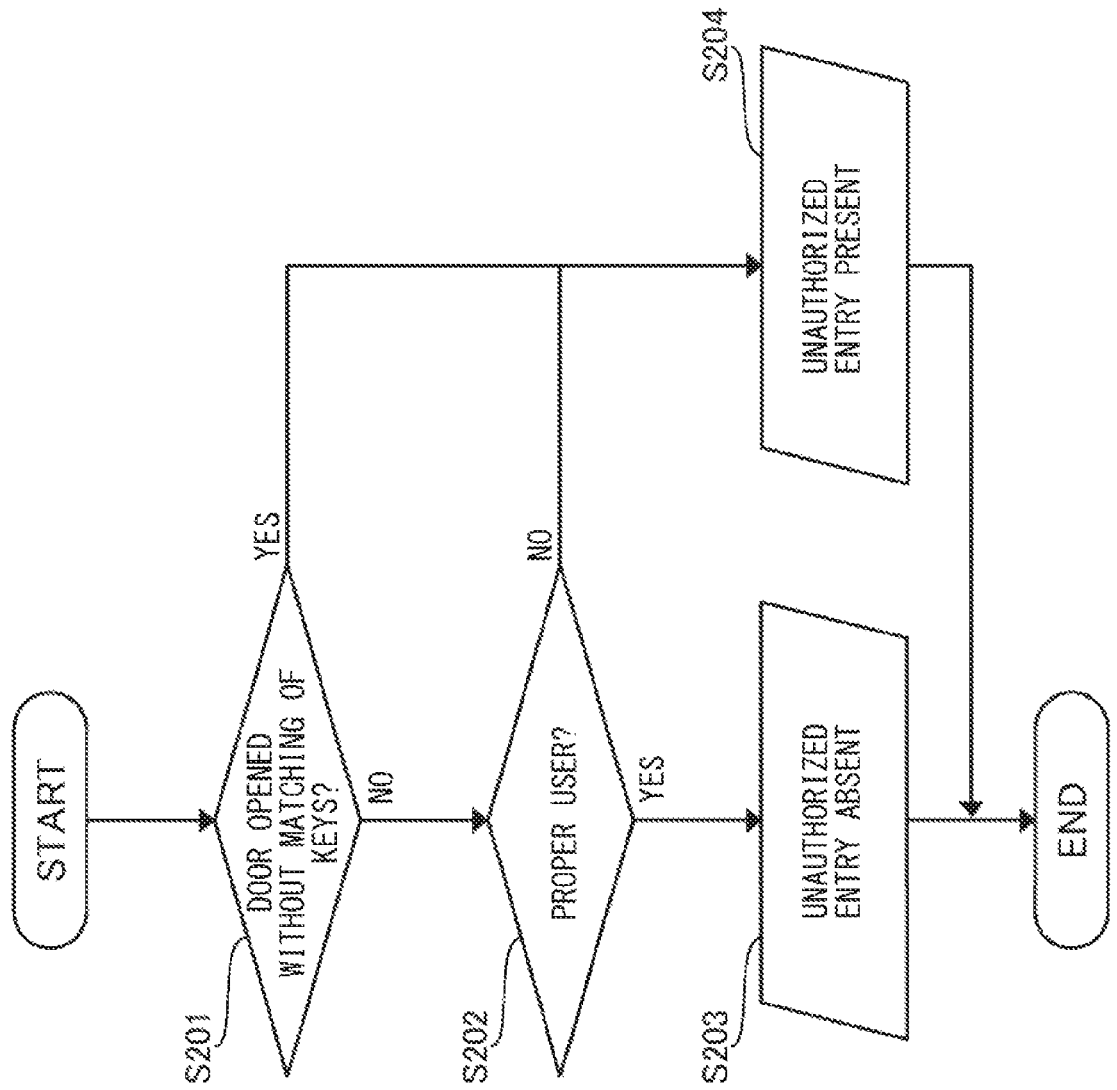
FIG. 4 is a flowchart illustrating an unauthorized entry determining process performed in the control apparatus for the vehicle according to one example embodiment.

A description is given next, with reference to flowcharts of FIGS. 3 and 4, of flows of processes to be performed by the thus-configured ECU 10 that serves as the control apparatus for the vehicle in one embodiment.

[Necessity Determining Process of Secure Boot Process and ECU Activation Process]

FIG. 3 is a flowchart illustrating an example of a necessity determining process of the secure boot process and an ECU activation process performed by the ECU 10 (the control apparatus for the vehicle according to one embodiment). Upon the start of the activation of the ECU 10 as a target to be subjected to the secure boot process, the necessity determining unit 24 may confirm whether the flag stored in the second storage 40 is the ON flag or the OFF flag (step S101).

If the ON flag is stored in the second storage 40 (step S101: NO) in the process of confirming the flag in step S101, the necessity determining unit 24 may notify the HSM 50 of the necessity to execute the secure boot process, following which the HSM 50 may execute the secure boot process (step S102). If the OFF flag is stored in the second storage 40 (step S101: YES), the necessity determining unit 24 may notify the HSM 50 of the unnecessity to execute the secure boot process, following which the HSM 50 may permit the processor 21 to activate the ECU 10 (step S105) without executing the secure boot process.

For example, the HSM 50 may execute the secure boot process that verifies all of the regions of any storage, including the first storage 30, in which the program to be executed by the CPU 20 is stored (step S103). The program is to be executed by the CPU upon the execution, by the ECU 10, of the control of the electronic device (the control target). Thus, whether the program to be subjected to the booting is appropriate is verified upon the activation of the ECU 10. If the program is determined as being inappropriate as a result of the verification (step S103: NO), the HSM 50 may prohibit the processor 21 from activating the ECU 10 (step S104), following which the process may end.

If the program is determined as being appropriate as a result of the verification (step S103: YES), the HSM 50 may permit the processor 21 to activate the ECU 10 (step S105). The ECU 10 thus successfully activated may start a regular operation (step S106), i.e., may control the electronic device (the control target). In parallel with the regular operation of the ECU 10, the unauthorized entry determining unit 23 may perform the unauthorized entry determining process (step S107). The unauthorized entry determining process will be described later in greater detail.

If the unauthorized entry determining unit 23 determines that the unauthorized entry is absent (step S108: NO), the unauthorized entry determining unit 23 may store, in the second storage 40, the OFF flag as the unauthorized entry data (step S109), following which the process may end. If the unauthorized entry determining unit 23 determines that the unauthorized entry is present (step S108: YES), the unauthorized entry determining unit 23 may store, in the second storage 40, the ON flag as the unauthorized entry data (step S110), following which the process may end.

The authorized entry data, i.e., the ON flag or the OFF flag, stored in the second storage 40 by the unauthorized entry determining unit 23 may be used at the time of making the determination as to the necessity of the secure boot process upon the next activation of the ECU 10.

In some embodiments, a storage region in which a program and data related to the secure boot process are stored may be verified prior to the process of confirming the unauthorized entry data, i.e., the secure boot continuation flag, performed in step S101. Performing the process of verifying the storage region prior to the process of confirming the unauthorized entry data helps to ensure even more a safety of, for example, the process of confirming the unauthorized entry data.

[Unauthorized Entry Determining Process]

FIG. 4 is a flowchart illustrating an example of the unauthorized entry determining process to be performed by the unauthorized entry determining unit 23.

The unauthorized entry determining unit 23 may determine the presence of the authorized entry into the vehicle, on the basis of the status data of the vehicle acquired from the status data acquiring unit 22. For example, the unauthorized entry determining unit 23 may acquire the status data indicating the authentication key matching result obtained by the vehicle monitoring ECU 10B, and determine whether the key used for unlocking of the door of the vehicle and the authentication key registered in advance on the vehicle are coincident with each other (step S201). If the key used for the unlocking of the door and the authentication key are not coincident with each other (step S201: YES), the unauthorized entry determining unit 23 may determine that the authorized entry is present (step S204), and may end the unauthorized entry determining process.

If the key used for the unlocking of the door and the authentication key are coincident with each other (step S201: NO), the unauthorized entry determining unit 23 may acquire the status data indicating the user authentication result obtained by the occupant monitoring ECU 10A, and determine whether the occupant riding the vehicle is the proper user (step S202).

If the user riding the vehicle is determined as not being the proper user (step S202: NO), the unauthorized entry determining unit 23 may determine that the authorized entry is present (step S204), and may end the unauthorized entry determining process. If the user riding the vehicle is determined as being the proper user (step S202: YES), the unauthorized entry determining unit 23 may determine that the authorized entry is absent (step S203), and may end the unauthorized entry determining process.

After the ending of the unauthorized entry determining process, the process may proceed to step S108 of the flowchart illustrated in FIG. 3, at which the unauthorized entry determining unit 23 may store, in the second storage 40, the ON flag or the OFF flag in accordance with a result of the determination obtained by the unauthorized entry determining process (step S109 or step S110 of FIG. 3).

It should be noted that the unauthorized entry determining process described above is illustrative and non-limiting. The unauthorized entry determining process does not necessarily have to be performed by the ECU as a target to be subjected to the secure boot process as described above. In some embodiments, the unauthorized entry determining process may be performed by any ECU other than the ECU as the target to be subjected to the secure boot process, such as the occupant monitoring ECU 10A or the vehicle monitoring ECU 10B, and a result of the unauthorized entry determining process may be outputted to the ECU as the target to be subjected to the secure boot process.

The control apparatus for the vehicle according to an example embodiment described above determines a possibility of tampering of the program to be used for the control of the electronic device (the control target) by determining the presence of the authorized entry into the vehicle. The control apparatus for the vehicle may execute the secure boot process if the possibility of the tampering of the program is present, and may refrain from executing all or a part of the secure boot process if the possibility of the tampering of the program is absent.

Thus, the necessity of the secure boot process is determined on the basis of the presence of the possibility of the tampering of the program. Hence, it is possible to shorten a time required from the start of the activation to the completion of the activation of the ECU 10 in a case where the possibility of the tampering of the program is low. It is possible to secure adaptability to the tampering by executing the secure boot process in a case where the possibility of the tampering of the program is high.

Accordingly, it is possible to change a range of the verification to be performed by the secure boot process flexibly in accordance with a result of the determination of the unauthorized entry which is based on a state of monitoring of the vehicle. Hence, it is possible to achieve both the securement of the safety upon the activation of the ECU and the shortening of a process time required for the secure boot process.

In some embodiments, the unauthorized entry data following the execution of the unauthorized entry determining process may be stored upon the success of the activation of the ECU 10, and the thus-obtained unauthorized entry data may be used at the time of determining the necessity of the secure boot process upon the next activation of the ECU 10. Hence, it is possible to eliminate the necessity of performing a communication with another ECU included in the vehicle control system 1 upon the activation of the ECU 10.

Further, the necessity of the secure boot process is determined on the basis of the unauthorized entry determining process, which helps to take measures against, for example, the tampering of the program based on exchanging of the first storage 30 itself through the unauthorized entry into the vehicle in a case where the first storage 30 is a detachable storage medium such as the SD card (Registered Trademark).

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. Further, techniques according to example embodiments and their modification examples described above may be combined in any combination unless any particular contradiction or issue occurs in terms of a purpose, a configuration, etc., thereof.

The CPU 20 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the CPU 20 illustrated in FIG. 2.

The invention claimed is:

1. A control apparatus for a vehicle, the control apparatus comprising:
a processor configured to control a control target mounted in the vehicle;
a storage configured to contain unauthorized entry data, the unauthorized entry data indicating a presence of an unauthorized entry into the vehicle; and
a first determining unit configured to make a determination on a necessity of a secure boot process upon activation of the processor, on a basis of the stored unauthorized entry data, wherein the first determining unit is configured to make the determination on the necessity of the secure boot process, on the basis of the unauthorized entry data that is generated upon previous activation of the processor and stored in the storage upon the previous activation of the processor, wherein the control apparatus further comprises:
- a data acquiring unit configured to acquire status data of the vehicle; and
- a second determining unit configured to
  - make a determination on the presence of the unauthorized entry into the vehicle on a basis of the status data, and
  - store, in the storage, the unauthorized entry data generated on a basis of a result of the determination on the presence of the unauthorized entry, and wherein the first determining unit is configured to
- perform the secure boot process on the processor, in a case where the unauthorized entry data indicates that the unauthorized entry into the vehicle is present, and
- permit the activation of the processor without performing all or a part of the secure boot process on the processor, in a case where the unauthorized entry data indicates that the unauthorized entry into the vehicle is absent.

2. The control apparatus for the vehicle according to claim 1, further comprising:
- a data acquiring unit configured to acquire status data of the vehicle; and
- a second determining unit configured to
  - make a determination on the presence of the unauthorized entry into the vehicle on a basis of the status data, and
  - store, in the storage, the unauthorized entry data generated on a basis of a result of the determination on the presence of the unauthorized entry.

3. The control apparatus for the vehicle according to claim 2, wherein the first determining unit is configured to
- perform the secure boot process on the processor, in a case where the unauthorized entry data indicates that the unauthorized entry into the vehicle is present, and
- permit the activation of the processor without performing all or a part of the secure boot process on the processor, in a case where the unauthorized entry data indicates that the unauthorized entry into the vehicle is absent.

4. The control apparatus for the vehicle according to claim 1, wherein the first determining unit is configured to
- perform the secure boot process on the processor, in a case where the unauthorized entry data indicates that the unauthorized entry into the vehicle is present, and
- permit the activation of the processor without performing all or a part of the secure boot process on the processor, in a case where the unauthorized entry data indicates that the unauthorized entry into the vehicle is absent.

5. The control apparatus for the vehicle according to claim 1, wherein the control apparatus is an electronic control device (ECU).

6. The control apparatus for the vehicle according to claim 1, further comprising an unauthorized entry detector configured to:
- determine that a door of the vehicle is opened by an authenticated key;
- in response to determining that the door is not opened by the authenticated key, determine that the unauthorized entry occurs;
- in response to determining that the door is opened by the authenticated key, determine that a person who enters the vehicle after the door is opened is an authenticated user of the vehicle; and
- in response to determining that the person is not the authenticated user of the vehicle, determine that the unauthorized entry occurs.

7. A control apparatus for a vehicle, the control apparatus comprising:
- a storage configured to contain unauthorized entry data, the unauthorized entry data indicating a presence of an unauthorized entry into the vehicle; and
- circuitry configured to:
  - control a control target mounted in the vehicle; and
  - make a determination on a necessity of a secure boot process upon activation of the control apparatus, on a basis of the stored unauthorized entry data, wherein the circuitry is configured to:
- make the determination on the necessity of the secure boot process, on the basis of the unauthorized entry data that is generated upon previous activation of the circuitry and stored in the storage upon the previous activation of the circuitry;
- acquire status data of the vehicle;
- make a determination on the presence of the unauthorized entry into the vehicle on a basis of the status data;
- store, in the storage, the unauthorized entry data generated on a basis of a result of the determination on the presence of the unauthorized entry;
- perform the secure boot process on the circuitry, in a case where the unauthorized entry data indicates that the unauthorized entry into the vehicle is present; and
- permit the activation of the circuitry without performing all or a part of the secure boot process on the circuitry, in a case where the unauthorized entry data indicates that the unauthorized entry into the vehicle is absent.

8. The control apparatus for the vehicle according to claim 7, wherein the control apparatus is an electronic control device (ECU).

9. The control apparatus for the vehicle according to claim 7, wherein the circuitry is further configured to:
- determine that a door of the vehicle is opened by an authenticated key;
- in response to determining that the door is not opened by the authenticated key, determine that the unauthorized entry occurs;
- in response to determining that the door is opened by the authenticated key, determine that a person who enters the vehicle after the door is opened is an authenticated user of the vehicle; and
- in response to determining that the person is not the authenticated user of the vehicle, determine that the unauthorized entry occurs.

10. A control apparatus for a vehicle comprising circuitry configured to:
- perform first activation of a processor that is configured to execute a program to control a control target in the vehicle;
- in response to the processor being activated, determine whether unauthorized entry has occurred in the vehicle, while the processor executes the program to control the control target;

in response to determining that the unauthorized entry has occurred in the vehicle, store unauthorized entry data in storage;

after the processor is deactivated and before second activation of the processor is performed, determine whether the unauthorized entry data is stored in the storage;

in response to determining that the unauthorized entry data is stored, perform a secure boot process to verify safety of the program for the processor; and in response to determining that the unauthorized entry data is not stored, perform the second activation of the processor without performing all or a part of the secure boot process, wherein the circuitry is configured to:
make the determination on the necessity of the secure boot process, on the basis of the unauthorized entry data that is generated upon previous activation of the circuitry and stored in the storage upon the previous activation of the circuitry;
acquire status data of the vehicle;
make a determination on the presence of the unauthorized entry into the vehicle on a basis of the status data;
store, in the storage, the unauthorized entry data generated on a basis of a result of the determination on the presence of the unauthorized entry;
perform the secure boot process on the circuitry, in a case where the unauthorized entry data indicates that the unauthorized entry into the vehicle is present; and
permit the activation of the circuitry without performing all or a part of the secure boot process on the circuitry, in a case where the unauthorized entry data indicates that the unauthorized entry into the vehicle is absent.

11. The control apparatus for the vehicle according to claim 10, wherein the circuitry is further configured to:
determine that a door of the vehicle is opened by an authenticated key;
in response to determining that the door is not opened by the authenticated key, determine that the unauthorized entry occurs;
in response to determining that the door is opened by the authenticated key, determine that a person who enters the vehicle after the door is opened is an authenticated user of the vehicle; and
in response to determining that the person is not the authenticated user of the vehicle, determine that the unauthorized entry occurs.

12. The control apparatus for the vehicle according to claim 10, wherein the control apparatus is an electronic control device (ECU).

* * * * *